(12) United States Patent
Storelli

(10) Patent No.: US 6,237,276 B1
(45) Date of Patent: *May 29, 2001

(54) LEVITATING BAIT WEEDLESS FISHING LURE

(76) Inventor: John Storelli, 631 NE. 18th Ave., Ft. Lauderdale, FL (US) 33304

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,480

(22) Filed: Dec. 30, 1996

(51) Int. Cl.⁷ .......................... A01K 97/00; A01K 93/00
(52) U.S. Cl. .............................. 43/43.15; 43/43.1
(58) Field of Search .................. 43/43.1, 43.15, 43/42.37

(56) References Cited

U.S. PATENT DOCUMENTS

| | | |
|---|---|---|
| 771,263 | 10/1904 | McCord . |
| 1,212,752 | 1/1917 | Fiebig . |
| 1,251,994 | 1/1918 | Farmes . |
| 1,906,791 | 5/1933 | Grossman . |
| 1,991,253 | 2/1935 | Kerns . |
| 2,244,032 | 6/1941 | Timm . |
| 2,448,523 | 9/1948 | Fibiger . |
| 2,456,254 * | 12/1948 | Caruso .............................. 43/43.15 |
| 2,543,293 | 2/1951 | Leitch et al. . |
| 2,567,787 | 9/1951 | Sahutski . |
| 2,572,340 | 10/1951 | Hockenhull . |
| 2,710,480 | 6/1955 | Gehrig . |
| 2,724,205 | 11/1955 | Howard . |
| 2,735,214 | 2/1956 | Stenseng . |
| 2,813,365 | 11/1957 | Cross . |
| 2,817,920 | 12/1957 | Mitchell et al. . |
| 3,006,104 | 10/1961 | Allen . |
| 3,235,999 | 2/1966 | Wieszeck . |
| 3,364,614 * | 1/1968 | Huebotter ........................ 43/43.15 |
| 3,372,508 * | 3/1968 | Maglinger ........................ 43/43.15 |
| 3,841,012 | 10/1974 | Maled . |
| 3,841,013 * | 10/1974 | Sabagonis ........................ 43/43.15 |
| 4,232,469 | 11/1980 | Shiverdecker . |
| 4,380,132 | 4/1983 | Atkinson . |
| 4,536,985 | 8/1985 | Caviness . |
| 4,674,224 | 6/1987 | Williams . |
| 4,832,650 | 5/1989 | Tong . |
| 5,105,573 | 4/1992 | Mays . |
| 5,107,615 | 4/1992 | Shaffer . |
| 5,133,148 | 7/1992 | Lawson . |
| 5,159,773 | 11/1992 | Gentry et al. . |
| 5,373,659 | 12/1994 | Neese, Jr. . |

FOREIGN PATENT DOCUMENTS

| | | | |
|---|---|---|---|
| 278853 * | 2/1952 | (CH) | ................................. 43/43.15 |
| 2280830 * | 2/1995 | (GB) | ................................. 43/43.1 |

* cited by examiner

*Primary Examiner*—Kurt Rowan
(74) *Attorney, Agent, or Firm*—Gary L. Shaffer

(57) ABSTRACT

A weedless fishing lure is provided, comprising a float, a connector and an attractant, such as live bait or an insect replica, suspended above the surface of water in which the lure is borne. The float may be disguised as a water plant, fallen tree leaf, twig or other floating detritus or water creature. The attractant may replicate an insect such as a dragonfly, an insect larva such as a hellgrammite, or any other natural or artificial fish bait or prey. The lure is adjustable so that the relative position of the attractant or bait with respect to the float and the water surface may be changed depending on the particular fish sought or the conditions present. In one form, the specific gravity of the invention may be adjusted by adding counterweights to vary its floating and casting properties. In another form of the invention, a snag-free platform is provided comprising a float and a connector suitable for suspending above a body of water a hook or an attractant chosen for specific fish or conditions.

16 Claims, 3 Drawing Sheets

LEVITATING BAIT WEEDLESS FISHING LURE

The present invention relates to water-borne lures, and more particularly to fishing lures which present a realistic attractant to fish while simultaneously minimizing the chances of entanglement in water-borne plants or debris.

BACKGROUND OF THE INVENTION

Fishing lures have various features directed toward minimizing or eliminating snags in water-borne weeds or debris. For example, U.S. Pat. No. 5,107,615 to Shaffer discloses a lure having a hook disposed to lie within a shield so that the point of the hook protrudes through an aperture in the shield to assume a fish catching position only when pressure is applied by the mouth of a fish.

Another common problem relating to water-borne lures is that of presenting an attractant which is borne realistically enough to lure fish efficiently. Numerous approaches have been employed in the art in order to provide a realistic attractant. For instance, some lures are configured to replicate small injured fish, swimming frogs, flies, spiders, insect larvae, and numerous other fish prey. However, until the present invention, no lure has provided the advantages of a weedless water-borne lure with those of an attractant which replicates realistically the behavior of fish prey. Thus, there is a need for a lure which provides a realistic attractant combined with a weedless configuration which is still capable of easy manufacture at relatively low cost.

SUMMARY OF THE INVENTION

In view of these and other needs in the art, and in view of the disadvantages inherent in numerous known types of water-borne lures, the present invention provides a lure having a realistic attractant and hook both of which levitate above the surface in which the lure is borne to thereby minimize or eliminate disadvantageous snags. The interaction between the float and attractant elements of the invention is transmitted through the connector element. Thus, the connector element transmits the motion or vibration of the float element to the attractant so that parts of the attractant wiggle or otherwise move and thereby appear to hover or dangle over the water surface. Another advantageous aspect of the present invention is found in the fact that the hook element of the attractant is also held above the water surface to thereby avoid snags. The present invention therefore combines the advantages of a realistic attractant, such as a dragonfly replica, for example, which is held realistically above a water surface by the connector and float elements of the invention to thereby appear to hover.

As one of skill in the art will understand, the present invention is not limited in its application to the details of construction and to the arrangements of the components set forth in the following description and drawings. The invention is capable of various other embodiments and of being practiced and carried out in various ways. One of skill in the art will also understand that the terminology and phraseology employed herein to describe the present invention are illustrative and not limiting.

In this regard, those skilled in the art will appreciate that the concept upon which the present invention is based may readily be utilized as a basis for the designing of other structures, methods, and configurations for carrying out the several purposes of the present invention. Accordingly, it is important that the claims be regarded as including such equivalent instructions insofar as they do not depart from the spirit and scope of the present invention.

It is therefore an object of the present invention to provide a new water-borne lure which includes the advantageous aspects of other lures in the art as well as many novel features heretofore unknown in the art.

It is also an object of the invention to provide a lure which, when floating in water, levitates its attractant element so that a hooking means attached to the attractant is held above the surface of the water to thereby eliminate or minimize snags.

It is a further object of the present invention to provide a floating lure having an attractant means whose position with respect to the float, and therefore with respect to the surface of the water, is adjustable.

In accordance with this and other objects of the invention, a snag-resistant fishing lure is provided comprising a float, an attractant comprising a hook, and a connector for connecting the float to the attractant so that the hook is held above the surface of an aqueous fluid, for example a stream, in which the lure is placed.

In accordance with other objects of the invention, the lure may be configured so that wherein both the attractant and the hook are held above the surface of the aqueous fluid, and wherein the connector comprises a resilient material so that the attractant moves in relation to the float when force is applied to either the float or the attractant.

In accordance with further objects of the invention, the connector comprises one or more materials selected from the group consisting of metals, plastics, fibers, composite materials, bamboo and wood, and wherein one or more of the float, the attractant or the connector comprises means for attaching a fishing line to the lure.

In accordance with still other objects of the invention, the float is configured to have flat or rounded surfaces so that the lure does not snag on plants or detritus in the aqueous fluid. A lure according to the invention is thus adaptable to any type of saltwater environment including calm shallows or open seas, or fresh water environments such as rapid streams or brackish waters such as those found in lagoons and swamps.

In accordance with still other objects of the invention, the attractant replicates one or more from the group consisting of insects, arachnids, amphibians, reptiles, insect larvae, echinoderms, birds, small fish and small animals. Examples of attractants include living or replicas of dragonflies, frogs, mice, hellgrammites, caddis flies, deer flies, damsel flies, waterbugs, spiders, meal worms, earthworms, and crickets. In some embodiments of the invention, at least a portion of the attractant comprises at least one segment which wiggles in relation to other segments of the attractant when force is applied to the lure.

In accordance with additional objects of the invention, the float replicates one or more from the group consisting of leaves or other plant parts, whole plants, driftwood or other debris, and the specific gravity of the lure with respect to pure water is between 0.30 and 0.95.

Additional aspects in accordance with the invention include wherein the connector is frangible to the extent that it breaks under the force applied by a striking fish so the attractant is free of the float and the connector, and wherein the specific gravity of the lure is adjustable to thereby control the depth of the float in the aqueous fluid and the height of the hook above the aqueous fluid, and wherein the connector is deformable to the extent that the position of the attractant in relation to the float and the aqueous fluid is adjustable.

In accordance with still other objects of the invention, a snag-resistant fishing lure platform is provided comprising a float, a connector suitable for suspending a hook or an attractant above the surface of a body of water in which the platform is placed, and means for attaching the lure to a fishing line.

The various components of the lure according to the invention can be made from materials conventional in the field. For example, the attractant means can be formed of moldable material such as plastics, fabric, metals, wood or other plant products, and fibers, all known in the trade or that may be adaptable to the purpose and spirit of the attractant element of the present invention. Alternatively, the attractant can be any conventional fly, insect, or other fish prey replica known in the art.

In one embodiment of the present invention, a float, connector and means for attaching an attractant to the connector, such as a conventional fly or live bait, are provided. Thus, a user of the invention can tailor it to the specific type of fish being sought or to bait availability due to seasonal changes. The hook element of the attractant is preferably formed from metal as is conventional in the fishing lure art, although it may also be made of fiberglass or other composite materials of sufficient strength and rigidity to form a hooking means.

DETAILED DESCRIPTION OF THE PREFERRED EMBODIMENTS

Figure 1:
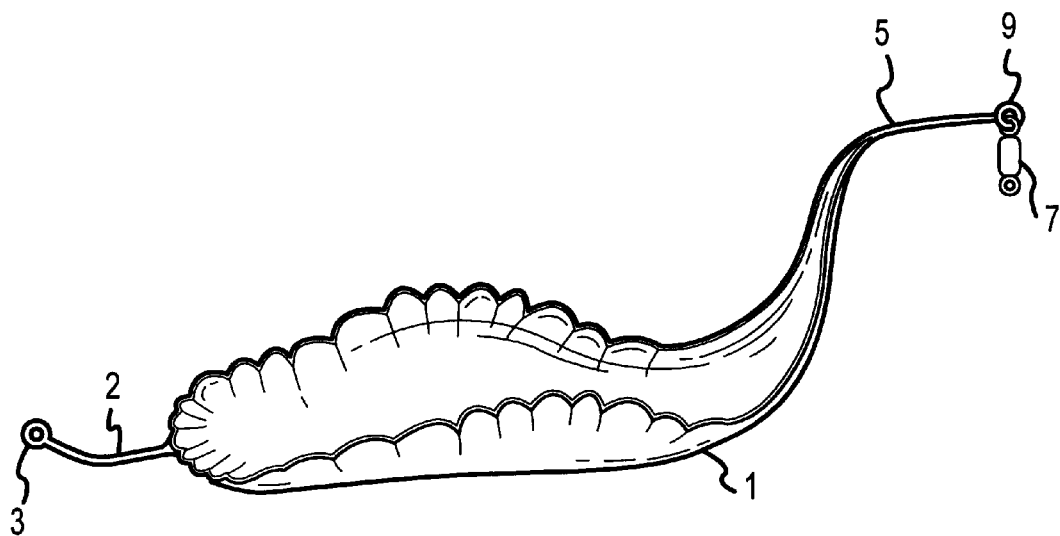
FIG. 1 is an oblique side view of a fishing lure float and connector according to the invention.

The advantages and characteristics of the levitating bait weedless fishing lure of the present invention can be elucidated from the following detailed description of two embodiments of the invention to be taken as examples and not as limitations in conjunction with the accompanying drawings. From the information disclosed herein, it is also clear that many permutations of the present invention are possible by combining the various components described in the drawings and specifications and by adding other elements within the spirit of the invention.

FIG. 1 shows a side oblique view of a lure according to the invention and lacking an attractant. With reference to FIG. 1, a levitating bait weedless fishing lure comprises a float 1, replicating a fallen leaf, and composed of, for example, cork, wood, Styrofoam® polypropylene or other plastic foam, or any other material having a suitably low specific gravity with respect to the 1.00 specific gravity of pure water. Float 1 is provided with stem 2 having eyelet 3 for attaching the lure to a fishing line. Stem 2 is suitable for the attachment of counterweights such as split lead shot, as is known in the fishing art. An extended portion of float 1 forms connector 5, which can be made of wire, fiberglass or other composite material, or any resilient material known in the art. Connector 5 is provided with loop 9 for connection to an attractant or hook (not shown) by means of swivel 7, although a swivel is not necessary to the functioning of the invention. Connector 5 can be attached to float 1 by adhesives, pins, screws or by other mechanical fasteners known in the art, or, when the float is of plastic, preferably is molded into float 1 during manufacture.

Figure 2:
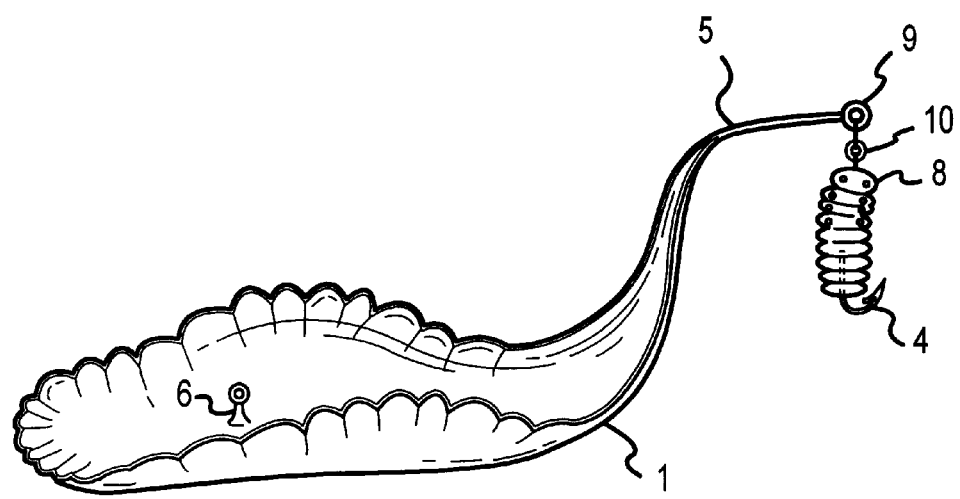
FIG. 2 is a similar view to that of FIG. 1 showing the lure further provided with a hook having a live attractant thereon.

FIG. 2 shows the levitating bait weedless fishing lure of FIG. 1 further provided with a hook and live bait attractant. Hook 4, of metal as known in the fishing hook art, is provided with eyelet 10 for attaching hook 4 to connector 9. Live insect larva 8 is shown with hook 4 therethrough so that movement of larva 8 also will cause movement of hook 4 above the surface of water in which the lure is placed to thereby attract a fish to strike larva 8 and be hooked by hook 4.

Figure 3:
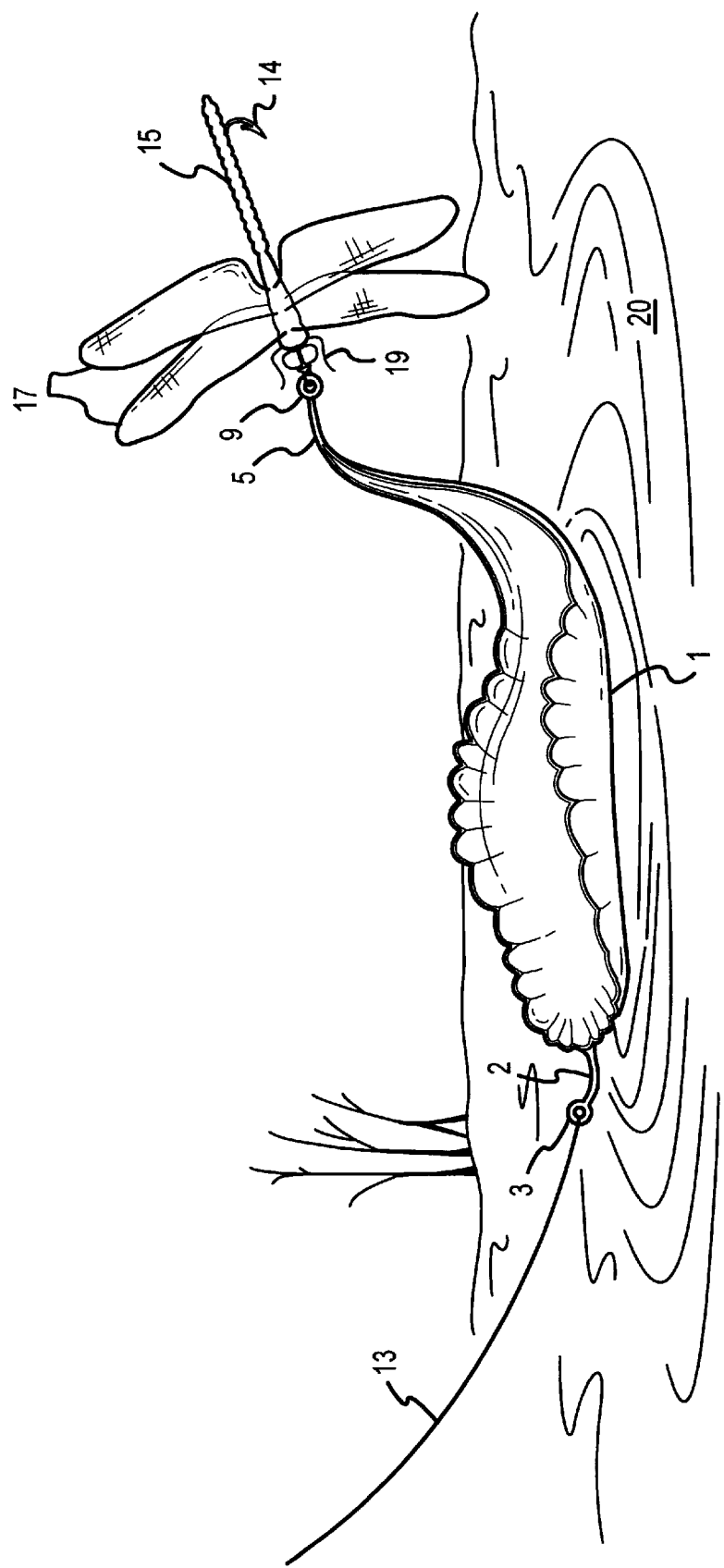
FIG. 3 is an oblique side view of a fishing lure according to the invention floating in water and comprising a replica of an adult dragonfly as an attractant.

FIG. 3 shows the lure of FIG. 1 in use on water surface 20 and further provided with an artificial insect as an attractant. With reference to FIG. 3, a weedless fishing lure according to the invention comprises a float 1, provided with stem 2 having eyelet 3 shown attached to fishing line 13. As in FIG. 1, an extended portion of float 1 forms connector 5, which is provided with loop 9. Attractant 15, which comprises a plastic replica of an adult dragonfly, is connected to float 1 by means of Loop 9 and connector 5. Attractant 15 is provided with wings 17, which are made of diaphanous plastic as known in the art, and legs 19, which are attached to attractant 15 by interlocking eyelets to permit movement. Thus, movement of any part of the lure causes wings 17 and legs 19 to move in relation to attractant 15 to thereby simulate a hovering dragonfly. Attractant 15 is provided with hook 14 as a means for hooking a fish which strikes attractant 15.

Figure 4:
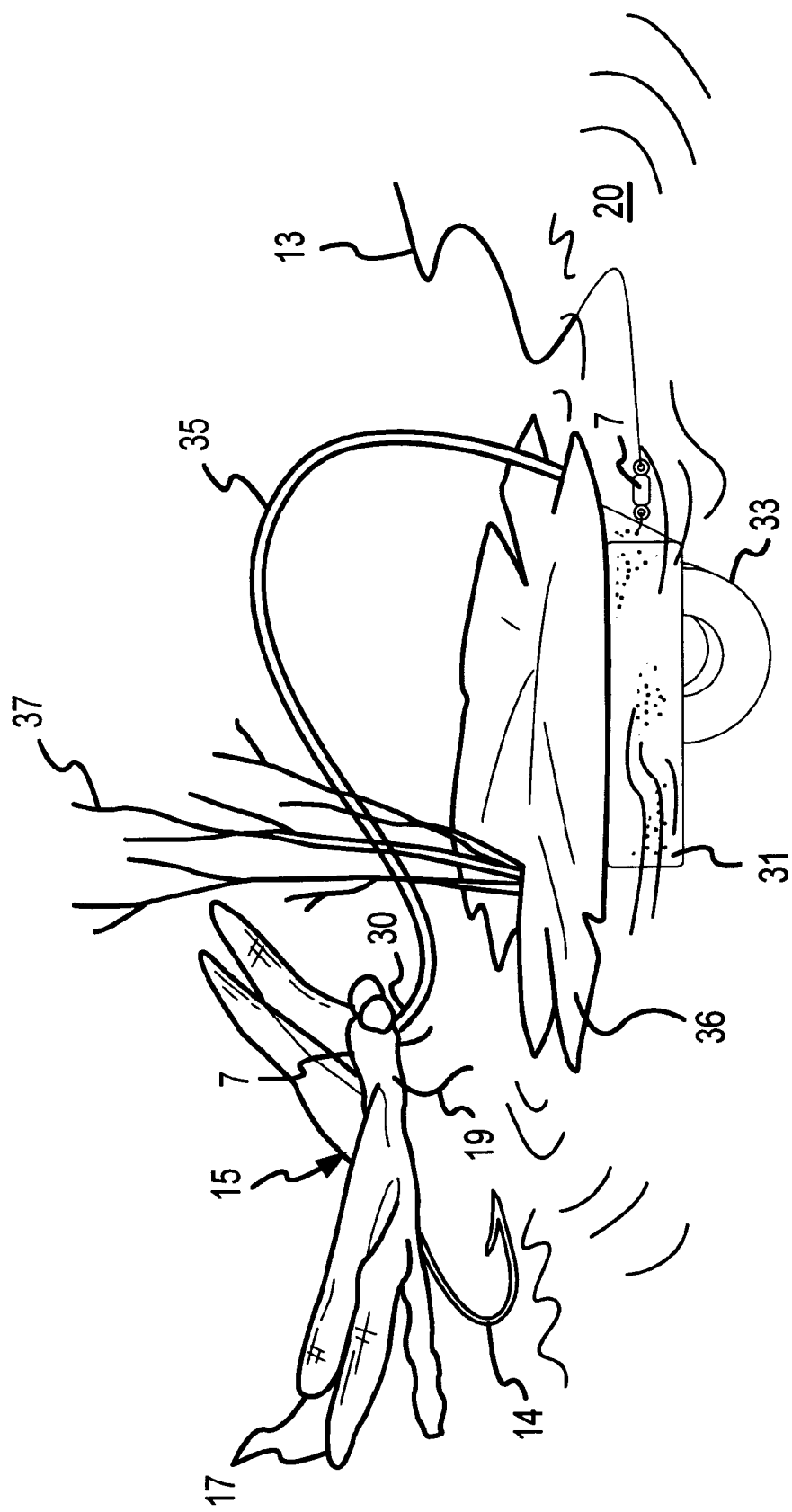
FIG. 4 is an oblique side view of an alternate embodiment of the invention wherein the float is camouflaged as a plant and is provided with a counterweight.

FIG. 4 shows an oblique side view of a weedless fishing lure according to the invention comprising an attractant as shown in FIG. 3 and further provided with a float having a submerged counterweight and plant-like camouflage. With reference to FIG. 4, float 31, of a buoyant material such as cork or plastic foam, is provided with counterweight 33, preferably made of metal and positioned so that the attractant 15 is levitated above water surface 20 in a realistic manner. Float 31 is provided also with plant-like camouflage 36 and 37, preferably made of plastic, and attached to float 31 by means of adhesives, wires, pins, screws, clips or by other ways known in the fishing lure art. Connector 35 can be of any material which is resilient enough to provide wiggling force to attractant 15. For example, connector 35 can be of spring steel, a coiled spring formed of metal, plastic, or composite material, or may be formed of any material which can be bent, formed, or extruded into a shape having resilience to provide wiggling action to the attractant.

In some embodiments of the invention, connector 35 comprises a frangible link or section made of, for example, metal, plastic, or composite material, or may be formed of any material which can be formed so that it breaks away from the float element of the invention when the attractant is struck by a fish. In such embodiments, the attractant itself is provided with means for attaching to a fishing line.

Connector 35, having connector attractant end 30, connects to attractant 15 to thereby suspend it above water surface 20 and communicate movement to attractant 15. Attractant 15 includes attractant legs 19, which are preferably movably attached to attractant body 7 so they may move in relation to the body to thereby provide additional realistic movement. Attractant 15 also includes hook 14 preferably made of metal or other conventional materials known in the art, and attractant wings 17. Attractant wings 17 are preferably made of a thin translucent or transparent plastic such as polyethylene which may flutter freely when exposed to changes in air pressure or when exposed to vibrations of attractant body 15.

With respect to the present description, one of skill in the art will recognize that the optimal dimensional relationships for the elements of the invention, including variations in size, materials, shape, form, function and manner of operation, assembly and use, are readily apparent and equivalent relationships to those illustrated in the present description and drawings and are intended to be encompassed by the present invention. For example, a larger form of the lure according to the invention may be advantageous in the pursuit of larger fish such as lake bass or muskellunge, or fish living in saltwater habitats.

What is claimed is:

1. A snag-resistant fishing lure comprising,
    A. a float comprising a fluid-contacting surface and at least one distal margin, wherein said fluid-contacting surface is constructed and arranged so that said lure does not snag on plants or detritus in the aqueous fluid in which said lure is placed,
    B. an attractant comprising a hook,
    C. a connector for connecting said float to said attractant, wherein said connector extends upwardly and back over said float so that
        (i) said hook is held upwardly and outwardly from said distal margin of said float and above the surface of said aqueous fluid,
        (ii) said attractant moves in relation to said float when force is applied to said float, said connector or said attractant, and
        (iii) said attractant replicates one or more from the group consisting of insects, arachnids, amphibians, reptiles, insect larvae, earthworms and other echinoderms, birds, small fish and small animals, and
    D. means for attaching said attractant to a fishing line wherein said means is held above the surface of said aqueous fluid.

2. The lure of claim 1, wherein both said attractant and said hook are held above said surface of said aqueous fluid.

3. The lure of claim 1, wherein said connector comprises a resilient material so that said attractant moves in relation to said float when force is applied to either said float or said attractant.

4. The lure of claim 3, wherein said connector comprises one or more materials selected from the group consisting of metals, plastics, glasses, fibers and wood.

5. The lure of claim 1, further comprising means for attaching said attractant directly to a fishing line.

6. The lure of claim 1, wherein said float is configured to have rounded surfaces so that said lure does not snag on plants or detritus in said aqueous fluid.

7. The lure of claim 1, wherein said attractant replicates a dragonfly.

8. The lure of claim 1, wherein at least a portion of said attractant comprises at least one segment which wiggles in relation to other segments of said attractant when force is applied to said lure.

9. The lure of claim 8, wherein said at least one first segment which wiggles in relation to said other segments of said attractant when force is applied to said lure comprises at least one wing of said attractant.

10. The lure of claim 8, wherein said at least one first segment which wiggles in relation to said other segments of said attractant when force is applied to said lure comprises at least one leg of said attractant.

11. The lure of claim 8, wherein said at least one first segment which wiggles in relation to said other segments of said attractant when force is applied to said lure comprises at least one tail of said attractant.

12. The lure of claim 1, wherein said float replicates one or more from the group consisting of leaves, plants, twigs, driftwood, and turtles.

13. The lure of claim 1, wherein the specific gravity of said lure with respect to pure water is between 0.30 and 0.95.

14. The lure of claim 5, wherein said connector is frangible to the extent that it breaks under the force applied by a striking fish so that said attractant is free of said float and said connector but is still connected to said fishing line.

15. The lure of claim 1, wherein the specific gravity of said lure is adjustable to thereby control the height of said hook and said attractant above said aqueous fluid.

16. The lure of claim 1, wherein said connector is deformable to the extent that the height of said attractant above said aqueous fluid and the position of said attractant in relation to said float are adjustable.

* * * * *